3,192,101
SAFETY GLASS
Jack Leonard Koenig, Wilmington, Del., assignor to E. I. du Pont de Nemours and Company, Wilmington, Del., a corporation of Delaware
No Drawing. Filed Nov. 19, 1962, Ser. No. 238,764
8 Claims. (Cl. 161—199)

This invention relates to a multilayer safety glass, the transparency of which is reversibly variable with changes in temperature.

It is known in the art to produce glass laminates having an interlayer containing a material that changes color when subjected to light (see, for example, U.S. patent to R. M. Gruss, No. 1,678,218). It is further known to produce glass laminates having an interlayer that changes color when subjected to heat (see U.S. patent to Kuehl, No. 2,710,274). However, prior to this invention no effective safety glass was known in which the thermochromic material is completely compatible with the safety glass interlayer, and which did not cause the safety glass to delaminate or otherwise lose its properties that render the glass laminate shatter-proof.

It is an object of this invention to produce a safety glass laminate that will reversibly change color when subjected to differences in temperature and, at the same time, contain an interlayer compatible with the laminate, so there will be no delamination of the glass and no lessening of the shatter-proof properties of the laminate. It is a further object of this invention to produce a thermochromic safety glass laminate that is substantially more stable, more dependable and more durable than any known in the art. It is a further object of this invention to produce a thermochromic safety glass laminate that is substantially thinner than those known in the art. Other objects and advantages of this invention will be apparent to one skilled in the art from the disclosure.

It has been determined that a plasticized polyvinyl butyral resin interlayer containing from .1% to 2.5% cobalt amine complex by weight of the plasticized resin yields a highly satisfactory safety glass. The polyvinyl butyral resin should contain from 20 to 50 parts per 100 parts resin of a suitable plasticizer, such as triethylene glycol di-2-ethyl butyrate, dibutyl sebacate or dibutyl cellosolve adipate. It is generally preferable to include the complex in an amount such that there is about a 20% maximum decrease in light transmission through the laminate. The amount of complex required to effect such a change depends to some extent upon the complex chosen, but it is generally between .1 and 2% by weight of the plasticized resin. The complex can be added to the resin in any suitable manner, such as by blending the dissolved complex and the plasticized resin flake. Suitable solvents for the complexes of this invention are water, pyridine, and the like. Complexes found suitable for the safety glass of this invention include materials having the following formula: $Co(R^1)_6X_2$ and $Co(R^2)_3X_2$, wherein $R^1$ is a unidentate amine ligand of the class represented by pyridine, quinoline, chloropyridine, isoquinoline, piperidine, and piperazine; $R^2$ is a bidentate amine ligand of the class represented by hexamethylene tetramine, 2,2-bipyridine, and quinoline diethyl cyclohexylamine; and X is an anion of the class represented by chloride, bromide, iodide, nitrate sulfate, and perchlorate. The amine ligand of the cobalt complex may be substituted with lower alkyl groups and/or halogen groups.

Methods of preparing complexes of this type are known in the art, for example, Katzin et al., 72 Journal of the American Chemical Society, 5471–4 (1950).

The reaction that takes place upon heating the complex is believed to be as follows:

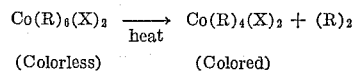

This reaction is reversible and shifts to the left as the temperature is lowered.

In order to be able to decrease the light transmission of the characteristics of the glass laminate quickly, it is necessary to be able to quickly apply heat to the polyvinyl butyral resin containing the thermochromic compound. This may be done electrically by means of resistance to heating of electric wires running through the resin, or preferably by treatment of the glass to render it electrically conductive by such methods as those disclosed in U.S. Patents 2,954,454, issued to Gaiser on September 27, 1960, and 2,977,450, issued to Boicey on March 28, 1961. The heat may also be supplied by means of convection and conduction as by blowing hot air against the glass surface.

Polyvinyl butyral resins such as disclosed in U.S. Patents 2,345,946, issued to Overbaugh on April 4, 1944, and 2,422,754, issued to Stamatoff on June 24, 1947, are useful as interlayers in the laminates of this invention.

In the following examples which illustrate the invention, all parts and percentages are in parts by weight unless otherwise specified.

Example I $Co(pyridine)_6Cl_2$ was prepared by adding 1 part $CoCl_2 \cdot 6H_2O$ to 1.1 parts pyridine dissolved in 1.1 parts chloroform. The mixture was allowed to evaporate. The solid material was extracted in trichloromethane and the extract evaporated. The product was $Co(pyridine)_6Cl_2$.

To a 10 grams sample of polyvinyl butyral resin containing 4.45 grams triethylene glycol di-2-ethyl butyrate, .1 gram of $Co(pyridine)_6(Cl)_2$ was added as a solution in about 10 cc. of water. The solution was previously prepared by heating the water to about its boiling point and adding the pyridine complex. The mixture was blended with a mechanical blender until the mixture was uniform. The mixture was then extruded into a sheet about 15 mil. The sheet was then placed between 2 glass sheets and heated for 30 minutes at 150° C. The glass sheets were previously rendered conductive in a conventional manner, and had an electrical resistance of about 30 ohms/unit area. The glass sheet was then tested in the conventional manner to see if the added thermochromic complex effected the safty glass properties of the product. The delamination property of this laminate was substantially identical to the delamination properties of laminate made without the thermochromic compound. The tendency of the glass to shatter when struck a blow sufficient to cause the glass to break was likewise substantially identical to the laminate without the thermochromic complex. In fact, in all safety characteristics the glass laminates were substantially identical.

The laminate containing the thermochromic complex was then tested to see what effect heat would have upon the light transmission characteristics of the material. Electrodes of copper were attached to opposite edges of the glass laminate and a six volt source of power applied across the glass plates. The current applied was approximately 10 amps. The temperature of the glass rose from room temperature to 30° C. before any change of color was noted. At 50° C. the light transmission characteristics of the glass were decreased by 20%. No further change in light transmission was noted as the temperature was increased to 70° C. The laminate was cooled by blowing cold air against its surface, and as the laminate temperature dropped below 30° C. the last traces of color disappeared.

*Example II*

A glass laminate was prepared by the method set out in Example I, using dibutyl sebacate as the plasticizer and Co(hexamethylene tetramine)$_3$Br$_2$ as the complex. The glass laminate had substantially the same safety characteristics as that of Example I and the light transmission characteristics of the laminate were decreased by 20% at 55° C.

*Example III*

A glass laminate was prepared by the method set forth in Example I, using dibutyl sebacate as the plasticizer and Co(bipyridine)$_3$Cl$_2$ as the cobalt complex. The glass laminate had substantially the same safety characteristics as that of Example I. The light transmission characteristics of the laminate were decreased by 20% at 60° C.

I claim:
1. An interlayer for use in the fabrication of safety glass comprising plasticized polyvinyl butyral, said interlayer containing a cobalt amine complex selected from the class consisting of complexes having the formula Co(R$^1$)$_6$X$_2$ and Co(R$^2$)$_3$X$_2$, where R$^1$ is a unidentate amine ligand selected from the class consisting of pyridine, quinoline, chloropyridine, isoquinoline, piperidine, and piperazine; R$^2$ is a bidentate amine ligand selected from the class consisting of hexamethylene tetramine, 2,2-bipyridine, and quinoline diethylcyclohexyl amine; and X is an anion of the class consisting of chloride, bromide, iodide, nitrate, sulfate, and perchlorate.

2. The interlayer of claim 1 in which the plasticizer is present in said interlayer in an amount of 20 to 50 parts per 100 parts by weight of interlayer.

3. The interlayer of claim 2 in which the cobalt amine complex is present in the interlayer in the amount of .1 to 2.5 parts per 100 parts by weight of interlayer.

4. The interlayer of claim 3 in which the plasticizer is a member of the class consisting of triethylene glycol di-2-ethyl butyrate, dibutyl sebacate, and dibutyl Cellosolve adipate.

5. A thermochromic safety glass laminate comprising two panes of glass separated from each other by means of a plasticized polyvinyl butyral interlayer, said interlayer containing a cobalt amine complex selected from the class of complexes having the formula Co(R$^1$)$_6$X$_2$ and Co(R$^2$)$_3$X$_2$, where R$^1$ is a unidentate amine ligand selected from the class consisting of pyridine, quinoline, chloropyridine, isoquinoline, piperidine, and piperazine; R$^2$ is a bidentate amine ligand selected from the class consisting of hexamethylene tetramine, 2,2-bipyridine, and quinoline diethylcyclohexyl amine; and X is an anion of the class consisting of chloride, bromide, iodide, nitrate, sulfate, and perchlorate.

6. The thermochromic safety glass laminate of claim 5 in which the plasticized polyvinyl butyral interlayer contains 20 to 50 parts plasticizer per 100 parts by weight of interlayer.

7. The thermochromic safety glass laminate of claim 6 in which the cobalt amine complex is present in the interlayer in the amount of .1 to 2.5 parts per 100 parts by weight of interlayer.

8. The thermochromic safety glass laminate of claim 7 in which the plasticizer is a member of the class consisting of triethylene glycol di-2-ethyl butyrate, dibutyl sebacate, and dibutyl Cellosolve adipate.

References Cited by the Examiner

UNITED STATES PATENTS

| 2,710,274 | 6/55 | Kuehl | 161—40 |
| 2,946,711 | 7/60 | Bragaw et al. | 161—199 |

OTHER REFERENCES

Katzin et al.: J.A.C.S., 72 pp. 5471–4 (1950).

ALEXANDER WYMAN, *Primary Examiner.*
EARL M. BERGERT, *Examiner.*